United States Patent [19]

Tawel

[11] Patent Number: 5,299,285
[45] Date of Patent: Mar. 29, 1994

[54] NEURAL NETWORK WITH DYNAMICALLY ADAPTABLE NEURONS

[75] Inventor: Raoul Tawel, South Pasadena, Calif.

[73] Assignee: The United States of America as represented by the Administrator, National Aeronautics and Space Administration, Washington, D.C.

[21] Appl. No.: 71,206

[22] Filed: May 27, 1993

Related U.S. Application Data

[63] Continuation of Ser. No. 905,061, Jun. 24, 1992, abandoned, which is a continuation of Ser. No. 473,024, Jan. 31, 1992, abandoned.

[51] Int. Cl.$^5$ .......................... G06F 15/18; G06G 7/19
[52] U.S. Cl. ........................................... 395/24; 395/23
[58] Field of Search ..................................... 395/23, 24

[56] References Cited

U.S. PATENT DOCUMENTS

| | | | |
|---|---|---|---|
| 3,950,733 | 4/1976 | Cooper et al. | 364/900 |
| 4,829,925 | 7/1989 | Peckerar et al. | 364/819 |
| 4,912,647 | 3/1990 | Wood | 364/900 |
| 4,941,122 | 7/1990 | Weideman | 345/24 |
| 4,947,482 | 8/1990 | Brown | 395/24 |
| 4,959,532 | 9/1990 | Owechko | 350/331 |
| 5,075,871 | 12/1991 | Weidman | 395/24 |

OTHER PUBLICATIONS

"Design of Parallel Hardware Neural Network Systems From Custom Analog VLSI 'Building Block' Chips", Eberhardt et al., IJCNN, Jun. 18–22 1989; vol. 2.
"Parallel Distributed Processing", David Rumelhart and James McClelland, vol., 1986.
"An Introduction to Computing with Neural Network", Richard Lippmann, IEEE ASSP Mag., Apr. 1987.
"Simple Neural Optimization Networks", David Tank and John Hopfield, IEEE, 1986.
Tawel et al. "Does Neuron Learn Like The Synapse?" Feb. 15, 1989.

Primary Examiner—Allen R. MacDonald
Assistant Examiner—George Davis
Attorney, Agent, or Firm—John H. Kusmiss; Thomas H. Jones; Guy M. Miller

[57] ABSTRACT

This invention is an adaptive neuron for use in neural network processors. The adaptive neuron participates in the supervised learning phase of operation on a co-equal basis with the synapse matrix elements by adaptively changing its gain in a similar manner to the change of weights in the synapse io elements. In this manner, training time is decreased by as much as three orders of magnitude.

19 Claims, 5 Drawing Sheets

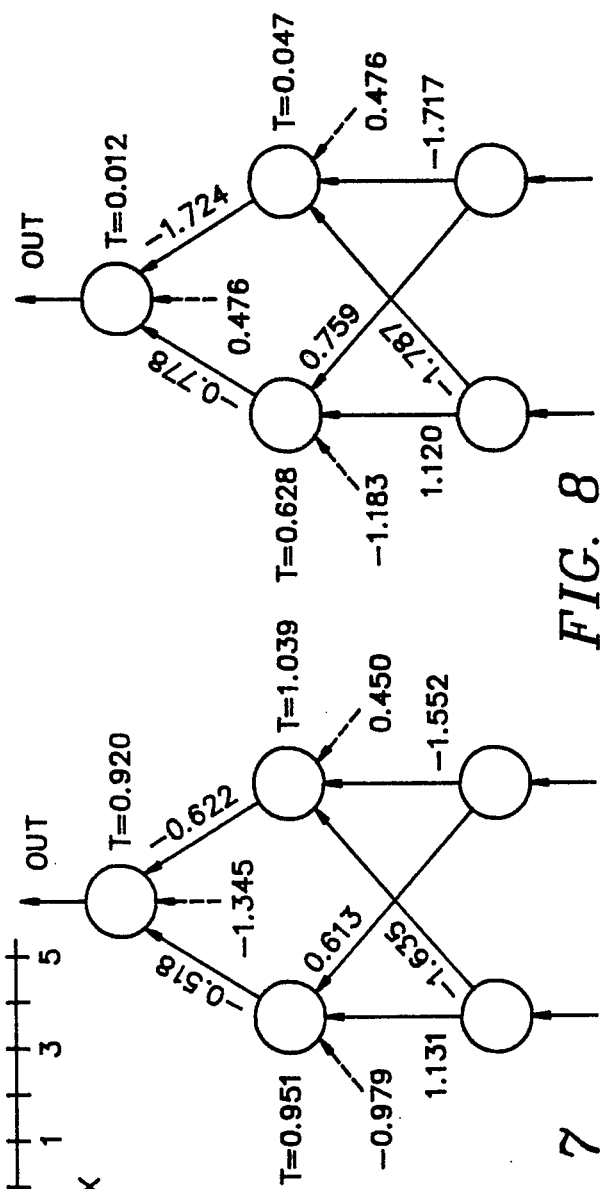
FIG. 7
FIG. 8
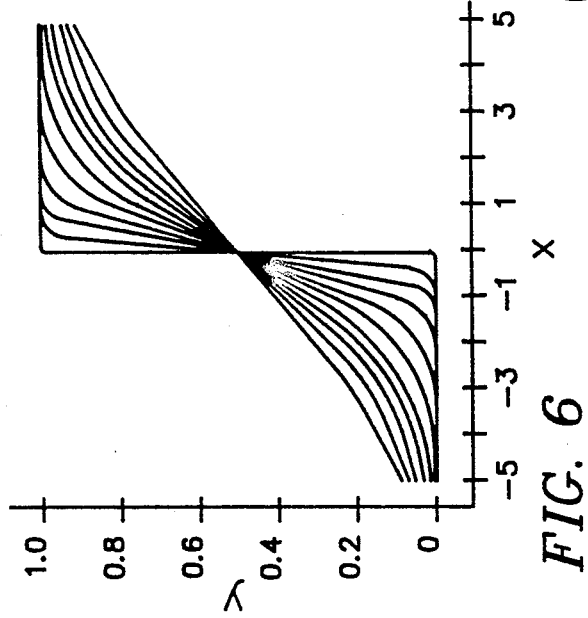
FIG. 6

NEURAL NETWORK WITH DYNAMICALLY ADAPTABLE NEURONS

ORIGIN OF THE INVENTION

The invention described herein was made in the performance of work under a NASA contract, and is subject to the provisions of Public Law 96-517 (35 USC 202) in which the Contractor has elected not to retain title.

This application is a continuation of application Ser. No. 07/905,061, filed Jun. 24, 1992, now abandoned which is a continuation of application, Ser. No. 07/473,024, filed Jan. 31, 1990, now abandoned.

TECHNICAL FIELD

The invention relates to neural networks and processors and, more particularly in a neural network employing a plurality of neurons connected to a network of conductors which are selectively interconnected by a plurality of problem-defining synapses each having an adjustable weighting factor wherein the network is parameterized in an iterative learning process in which problem-defining inputs to the neurons and the error signal between actual outputs from the network and expected output from the network are used to incrementally change the weighting factors, the improvement for reducing the number of iterations required from the network to learn how to solve a problem of interest comprising in each neuron between an input thereof for receiving at least one input signal and an output thereof for outputting an output signal value, including a neural conductive element having a variable gain and gain adjustment logic for dynamically adjusting the variable gain as a function of present values of the instantaneous error during a learning process of the neural network.

In the preferred embodiment, the gain adjustment logic makes incremental changes in the gain which are proportional to the negative of the derivative of the instantaneous error with respect to the gain. Further in the preferred embodiment, the incremental change $\Delta T$ for the $l^{th}$ neuron on a layer n can be given as:

$$\Delta T_l^n = -\eta \frac{\partial E}{\partial T_l^n}$$

where $\eta$ where is the temperature learning rate, which is a pre-established constant.

BACKGROUND ART

In the field of neural network processors, there is currently much interest as the ability to create large processors in a small space using VLSI techniques has suddenly made these analog techniques viable for purposes such as solving complex problems in real time. Problems such as best path location are quickly solved using the analog approach of a neural network whereas the same problem would be both hardware and time intensive if approached using digital computation facilities in a parallel processing manner.

While a neural network processor does its computations rapidly, it does have one drawback relative to the digital approach. With a digital computer, the problem to be solved is described as a series of precise logical steps to be accomplished. These steps are programmed into a series of computer instructions which are then loaded into the computer or computers which are to perform the calculations. At run-time, the input parameters for the problem to be solved are provided to the computer(s) and the problem instructions are executed to provide an answer to the problem. There are no possible variation; that is, a digital computer operates as a brute force automaton executing the sequence of instructions provided. If anything happens which is not provided for in the instruction sequence, the program fails and no meaningful results are provided.

The neural network, on the other hand, is patterned after the human brain and must be taught by a learning process. A typical prior art neural network can appear in basic form as depicted in FIG. 1 where it is generally indicated as 10. The network 10 comprises a matrix of conductors 12 to which a number of neurons 14 are connected to provide inputs. The conductors 12 are interconnected by a number of synapses 16 defining the general rules of the problem to be solved. The neurons 14 are generally non-linear elements having an input 18 to which an analog signal representing a variable of the problem to be solved can be connected. The outputs 20 of the neurons 14 are connected to the conductors 12 on one side of the synapses 16. The conductors 12 of the other side of the synapses 16 provide the outputs 22 of the network 10 representing the solution (in analog form) to the problem being solved.

A complex problem may take the form of a multi-layer neural network such as that generally indicated as 10' in FIG. 2. In such a multi-layer neural network 10', the analog inputs defining the problem are input as a first set of neurons 14. The outputs from the first layer of the network 10' are input to a second set of neurons 14 at the input to the second layer of the network 10' and the outputs representing the solution to the problem are found at the outputs 22 from the second layer of the network 10'.

A neural network (single layer 10 or multi-layer 10') "learns" by experience. A first set of variables for the problem to be solved are input to the network 10, 10' and the outputs 22 representing the solution to the problem for the given parameters are inspected. Each of the synapses 16 is then adjusted as to its performance factors (weight) in the total problem. As a result of the "answer" provided, the weights of the synapses 16 are adjusted slightly, as necessary, in a manner which will tend to move the answer to the problem closer to the correct answer. This process is repeated over and over with a second, third, etc. set of variables until the synapses 16 have all been adjusted to the point where the proper answer to the problem is given for any set of variables which are input. At that point, the network 10,10' has learned by experience how to solve the particular problem.

One of the current issues in the theory of supervised learning concerns the scaling properties of neural networks. While low-order neural computations are easily handled on sequential or parallel processors, the treatment of high-order problems proves to be intractable. The computational burden involved in implementing supervised learning algorithms, such as back propagation, on networks with large connectivity or lo training sets is immense and impractical. Until the development of fully parallel hardware, the treatment of such applications as image recognition or pattern classification prove unwieldy to handle current algorithms. It is clear, therefore, that a more computationally efficient learning rule is required to deal with such applications.

Current neuromorphic models regard the neuron as a strictly passive non-linear element and the synapse, on the other hand, as the primary source of information processing insofar as "learning" is concerned. In these standard prior art models, information processing is performed by propagating within a network synaptically weighted neuronal contributions in either a feedforward, feed-backward, or fully recurrent fashion. Information is contained in the synaptic weights and their rapid evaluation form the goal of these algorithms. Prior art artificial neural networks take the point of view that the neuron can be modeled by a simple non-linear "wire" type of device. The only prior art implementation of any adjustability to the neurons is depicted in FIG. 3. As depicted therein, the neurons 14 (i.e. implemented as non-linear elements as described above) can be manually adjusted en masse (as indicated by the dashed box 24) by means of a manual input device 26 under the control of a human operator. The neurons 14 each have an adjustable gain which is referred to in the art as the "temperature" of the neuron. Typically, the learning process begins with the temperature (i.e. the gain) of the neurons 14 at a high level. As the learning process proceeds, the operator may periodically and randomly begin to lower the temperature of all the neurons 14 simultaneously by means of the manual input device 26. This results in some measurable and meaningful improvement in the learning process of the network; that is, there is some decrease in learning time when the operator adjusts the temperature of the neurons 14.

Substantial evidence is beginning to emerge and be reported that information processing apparently occurs in biological neural networks (e.g. the human brain) at the neuronal level. If this is true, one can suppose that by providing a dynamically adaptable neuron element for use in artificial neural networks which adapts as part of the learning process along with the synapses, the learning process can be improved and the time therefor decreased significantly.

STATEMENT OF THE INVENTION

Accordingly, it is an object of this invention to provide a dynamically adaptable neuron element for use in artificial neural networks which adapts as part of the learning process along with the synapses.

It is another object of this invention to provide a dynamically adaptable neuron element for use in artificial neural networks which improves the learning process and decreases the time therefor significantly.

Other objects and benefits of this invention will become apparent from the detailed description which follows hereinafter when taken in conjunction with the drawing figures which accompany it.

BRIEF DESCRIPTION OF THE DRAWINGS

FIG. 6 is a graph of the activation function f shown plotted against the input s to an adaptive neuron according to the present invention as depicted in FIG. 5 for several different temperatures. The curves shown are for temperatures T ranging from 0.2 to 2.0 in increments of 0.2 with the sharpest activation curve being for $T=0.01$ and showing the high sensitivity of f with respect to T.

FIGS. 7 and 8 are simplified representations of the architecture of the neural network used for testing the adaptive neuron model on the XOR problem as discussed herein by way of example with FIG. 7 showing the randomized synaptic weights and neuronal temperatures prior to training and FIG. 8 showing these same weights after training.

DETAILED DESCRIPTION OF THE INVENTION

Figure 4:
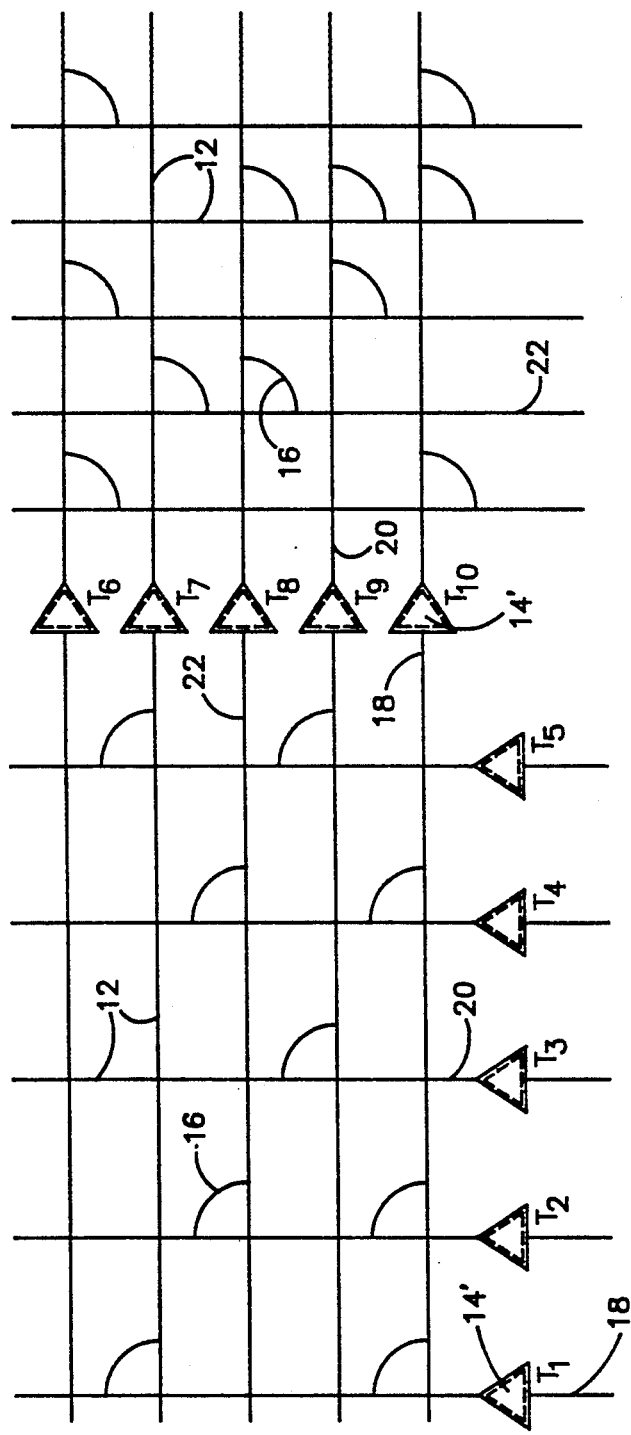
FIG. 4 is a simplified drawing depicting a multi-level neural network according to the present invention comprised of synapses and adaptive neurons in which the temperature of each neuron is dynamically regulated during the network's learning process.

A multi-level neural network 10''' according to the present lo invention is depicted in FIG. 4. The principle difference between the network 10''' and the prior art networks 10, 10' described above is the substitution of adaptive neurons 14' according to this invention for the standard, prior art neurons 14 described above. As noted in the drawing figure, each neuron 14' has its own temperature ($T_1$) associated with it. While a particular approach to implementing the adaptive neurons 14' is to be described in detail hereinafter and that particular implementation is that which was modeled and for which the results are reported, it should be recognized and appreciated by those skilled in the art that the basic point of novelty of this invention is the use of adaptive neurons within a neural network. It is this breadth which should be accorded the present invention as described and claimed hereinafter.

Figure 5:
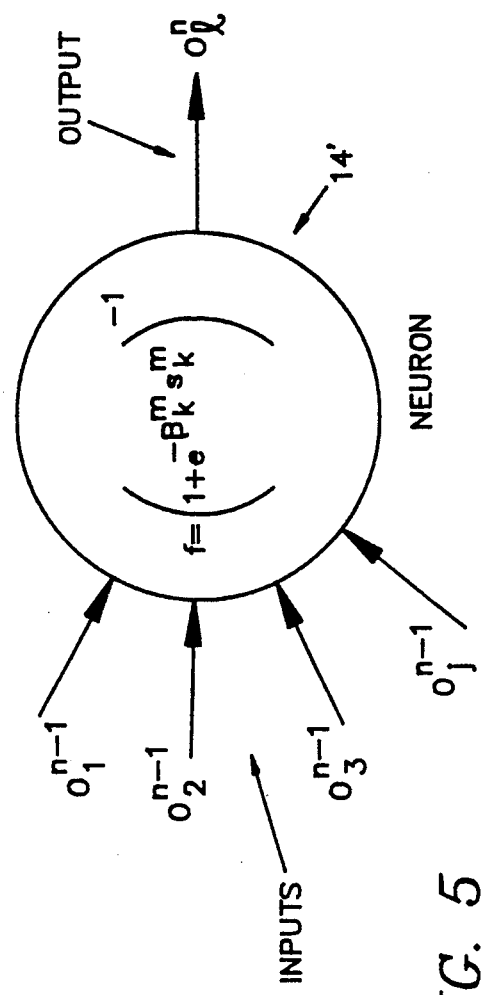
FIG. 5 is a simplified representation of one adaptive neuron according to the present invention and depicting the function whereby the temperature of the neuron is dynamically regulated during the network's learning process.

A neuron 14' according to the present invention in its preferred (and modeled) embodiment depicting the temperature adjustment algorithm employed is shown in FIG. 5. The neuron 14' on layer n receives its inputs from the outputs from the previous layer, n−1, and outputs its own output as a dynamically adjustable function of its temperature. Actually, the functional adjustment of the neuron 14' in its preferred embodiment is analogous to the functional adjustment of the synapses 16; that is, the adjustment of the synapses 16 is what can best and most accurately be described as a gradient decent in weight space. The preferred adjustment to the adaptive neurons 14' is a gradient decent in temperature space. This concept will now be addressed in more detail.

Figure 2:
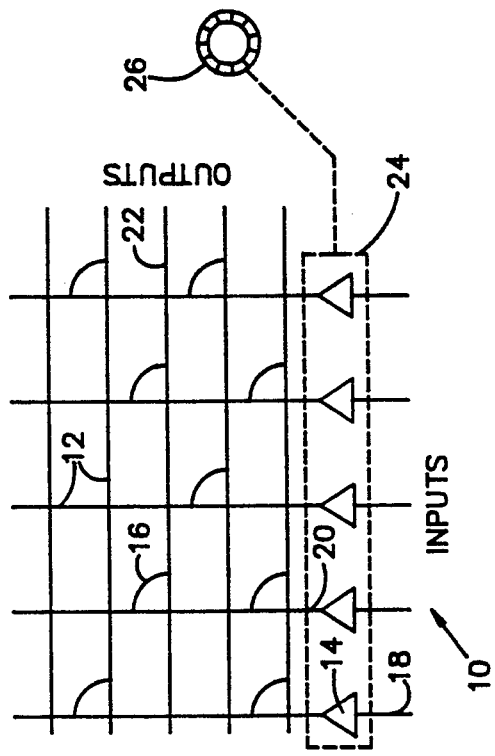
FIG. 2 is a simplified drawing depicting a basic prior art multi-level neural network.
Figure 3:
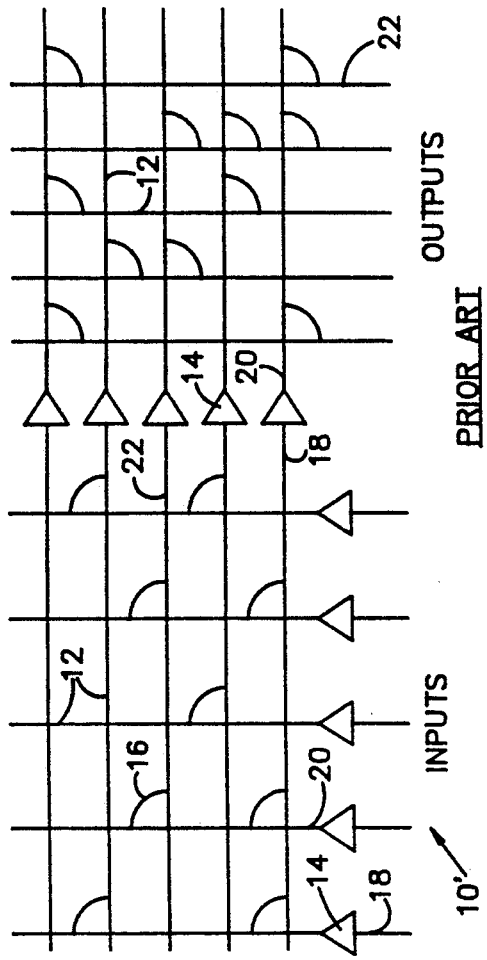
FIG. 3 is a simplified drawing depicting a basic prior art neural network comprised of neurons and synapses and indicating how the common temperature of the neurons can be regulated manually during the network's learning process.
Figure 1:
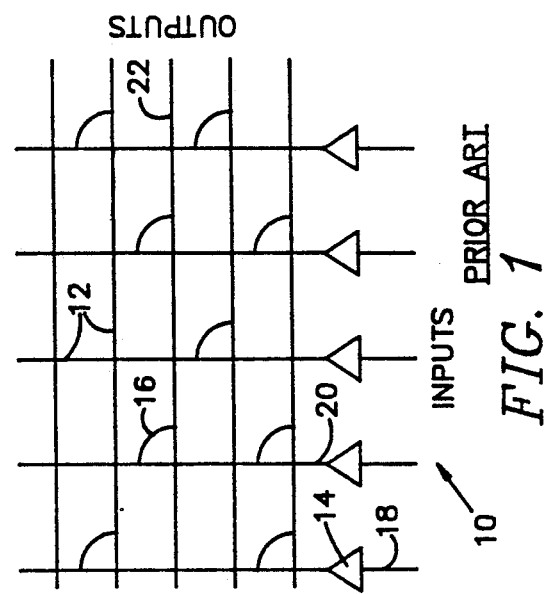
FIG. 1 is a simplified drawing depicting a basic prior art neural network comprised of neurons and synapses.

As mentioned earlier herein, the basic approach of this invention is the extending of the "learning" process to the neuron rather than the prior art approach of using the neuron as a mere conduit to the synapses which have the total learning responsibility. Such an extension can only be made after first defining what constitutes learning at the neuronal level. The adaptive neuron 14' can then be seen to provide an additional or secondary source of information processing and knowledge retention. This is achieved in this invention by treating both the neuronal and synaptic variables as optimization parameters. Both the amplitude and temperature (i.e. gain) of the sigmoid function represent such neuronal parameters. In much the same way that the synaptic interconnection weights (W) require optimization to reflect the knowledge contained within the training set, so should the temperature (T) term be optimized. It should be emphasized that the method of this invention does not necessarily optimize a global neuron parameter for the network; but rather, can either allow each neuron to have its own characteristic local value, or can determine a global one. In either case, however, the neuron parameters are dynamically adjustable as a function of the progress of the learning process and not independently and manually adjustable upon an associated physical basis as in the prior art case described above with respect to FIG. 3. It should be noted at this point that if the number of neurons in a network goes as O(N), then the number of synaptic connections typically increases as O(N²). The fact that the activation function is extremely sensitive to small changes in temperature or amplitude and that there are far fewer neuronal parameters to update than synaptic weights suggests that if indeed the temperature optimization scheme works, a significant reduction in convergence time is expected over standard back propagation.

Although the principle of neuronal optimization of this invention is an entirely general concept (and therefore applicable to any learning scheme), the popular feed-forward back-propagation learning rule was selected by the inventor herein for modeling implementation and performance testing. It is this particular tested implementation which is to be described hereinafter. It is the inventor's intent that the invention as described herein not be limited in any way because of the use of a particular example and implementation.

Back propagation is an example of supervised learning where, for each presentation consisting of an input vector $\vec{o}^{ip}$ and its associated target vector $\vec{t}^p$, the algorithm attempts to adjust the synaptic weights so as to minimize the sum-squared error E over all patterns p. The learning rule treats the interconnection weights as the only variable and consequently executes gradient descent in weight space. The error is given by $$E = \sum_p E_p = \frac{1}{2} \sum_p \sum_i [t_i^p - o_i^{np}]^2$$

The quantity $t_i^p$ is the $i^{th}$ component of the $p^{th}$ desired output vector pattern and $o_i^{np}$ is the activation of the corresponding neuron in the final layer n. For notational ease the summation over p is dropped and a single pattern is cnosidered. On completion of learning, the synaptic weights capture the transformation linking the input to output variables. One major drawback of this algorithm when implemented with prior art neurons is the excessive convergence time. It was expected by the inventor herein that a significant decrease in convergence time could be realized provided that the neurons were allowed to participate in the learning process. To accomplish this objective, each neuron in the network is characterized by a set of parameters whose values are optimized according to some rule, and not in a heuristic fashion as in simulated annealing. Upon training completion, learning is thus captured in both the synaptic and neuronal parameters. The scheme as implemented involves assigning a temperature, T, to each neuron, as seen in the activation function. These parameters are to be optimized so as to significantly decrease the network's learning time. Learning, therefore, is now captured in both the synaptic weights and neuronal parameters. The activation of a unit— say the $i^{th}$ neuron on the $m^{th}$ laye —is given by $o_i^m$. This response is computed by a non-linear operation on the weighted responses of neurons from the previous layer, as seen in FIG. 5. A common function to use is the logistic function, $$o_i^m = \frac{1}{1 + e^{-\beta s_i^m}}$$

and $T = 1/\beta$ is the temperature of the network. The net weighted input to the neuron is found by summing produces of the synaptic weights and corresponding neuronal outputs from units on the previous layer, $$s_i^m = \sum_j w_{ij}^{m-1} o_j^{m-1}$$

where $o_j^{m-1}$ represents fan—in units and the $w_{ij}^{m-1}$ the pairwise conenction strength between neuron i in layer m and neuron j in layer m−1. Furthermore, the particular rule chosen to optimize these neuronal parameters is based on gradient descent in the sum squared error, E, in temperature space.

Therefore, the incremental change in temperature term must be proportional to the negative of the derivative of the error term with respect to temperature. Focussing on the $l^{th}$ neuron on the layer n, the incremental change can be given as:

$$\Delta T_l^n = -\eta \frac{\partial E}{\partial T_l^n}$$

where $\eta$ is the temperature learning rate, which is a pre-established constant. This equation can be expressed as the product of two terms by the chain rule, $$\frac{\partial E}{\partial T_l^n} = \frac{\partial E}{\partial o_l^n} \frac{\partial o_l^n}{\partial T_l^n}$$

Substituting expressions and leaving the explicit functional form of the activation function unspecified, i.e. $o_l^n = f(T_{1n}^n, \ldots)$ we obtain, $$\frac{\partial E}{\partial T_l^n} = -[t_l - o_l^n]\frac{\partial f}{\partial T_l^n}$$

In a similar fashion, the temperature update equation for the previous layer is given by, $$\Delta T_k^{n-1} = \eta\frac{\partial E}{\partial T_k^{n-1}}$$

Using the chain rule, this can be expressed as, $$\frac{\partial E}{\partial T_k^{n-1}} = \sum_l \frac{\partial E}{\partial o_l^n}\frac{\partial o_l^n}{\partial s_l^n}\frac{\partial s_l^n}{\partial o_k^{n-1}}\frac{\partial o_k^{n-1}}{\partial T_k^{n-1}}$$

Substituting expressions and simplifying reduces the above to, $$\frac{\partial E}{\partial T_k^{n-1}} = \left[\sum_l -[t_l - o_l^n]\frac{\partial f}{\partial s_l^n}w_{lk}^{n-1}\right]\frac{\partial f}{\partial T_k^{n-1}}$$

By repeating the above derivation for the previous layer, i.e. determining the partial derivative of E with respect to $T_j^{n-2}$ etc., a simple recursive relationship emerges for the temperature terms. Specifically, the updating scheme for the $k^{th}$ neuronal temperature on the $m^{th}$ layer is given by, $$\Delta T_k^m = -\eta\frac{\partial E}{\partial T_k^m}$$

where, $$\frac{\partial E}{\partial T_k^m} = -\delta_k^m\frac{\partial f}{\partial T_k^m}$$

In the above expression, the error signal $\delta_k^m$ takes on the value, $$\delta_k^m = [t_k - o_k^m]$$

if neuron m lies on an output layer, or, $$\delta_k^m = \sum_l \delta_l^{m+1}\frac{\partial f}{\partial s_l^{m+1}}w_{lk}^m$$

if the neuron lies on a hidden layer.

The foregoing algorithm was tested by applying it to logic lo problems. The network (in the fashion of the network 10" of FIG. 4 including adaptive neurons 14') was trained on a standard benchmark employed in the art for such purposes, i.e. the exclusive-or (XOR) problem. It was useful to test the algorithm employed in the adaptive neurons of the present invention on such a problem since it is the classic problem requiring hidden units and since many problems involve an XOR as a subproblem. The application of the proposed learning rule involved two phases. In the first phase, an input pattern was presented and propagate forward through the network to compute the output values o. This output was then Lk compared to its target value, resulting in an error signal for each output unit. The second phase involved a backward pass through the network during which the error signal was passed along the network and the appropriate weight and temperature changes made. Note that in addition to the synapses and neurons having their own learning rates $\eta$ and $\eta$, respectively, an additional degree of freedom can be introduced, if desired. This is accomplished by allowing for relative time scales for weight and temperature updates, i.e. $\tau_W$ and $\tau_T$, respectively. This allows a particular simulation to place varying emphasis on either of the two updating schemes. In other words, the weight and temperature changes do no necessarily have to occur simultaneously. The two are truly autonomous and change independently as necessary for the network to learn in an optimum manner. Thus, what we have described is a gradient descent method for finding both weights and temperatures in any feed forward network.

In deriving the learning rule for temperature optimization as implemented in the present invention, the derivative of the activation function of a neuron played a key role. The inventor has used a sigmoidal type of function in his simulations whose explicate form is depicted in FIG. 5 and shown by the graph of FIG. 6 to be extremely sensitive to small changes in temperature. The sigmoid is shown plotted against the net input to a neuron for temperatures ranging from 0.2 to 2.0, in increments of 0.2. However, the stee-pest curve was for a temperature of 0.01. The derivative of the activation function taken with respect to the temperature is given by, $$\frac{\partial f}{\partial T_k^m} = -\frac{s_k^m}{T_k^{m2}}\frac{e^{-\beta k^m s_k^m}}{(1 + e^{-\beta k^m s_k^m})^2}$$

As shown in FIGS. 7 and 8, the XOR architecture selected has two input units, two hidden units, and a single output unit. Each neuron is characterized by a temperature, and neurons are connected by weights. Prior to training the network, both the weights and parameters were randomized. The initial and final optimization parameters for a sample training exercise are shown in the drawing figures. Specifically, FIG. 7 shows the values of the randomized weights and temperatures prior to training and FIG. 8 shows their values after training the network for 1,000 iterations. This is a case where the network has reached a global minimum. In both figures, the number associated with the dashed arrows represent the thresholds of the neurons, and the numbers written next to the solid arrows represent the excitatory/inhibitory strengths of the pairwise connections.

Figure 9:
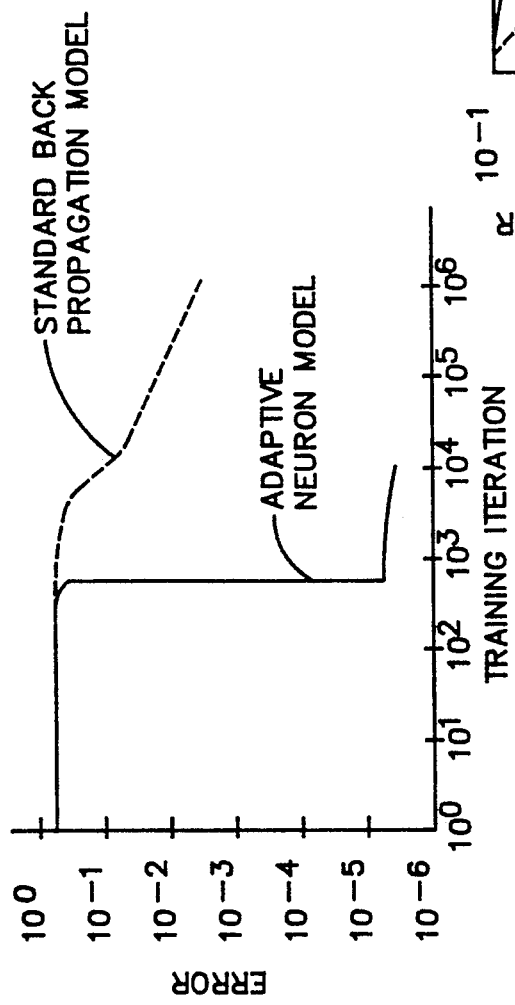
FIG. 9 is a graph showing a comparison of training statistics between the adaptive neuron model and the standard back propagation model with the error during training plotted against the training iteration number.
Figure 10:
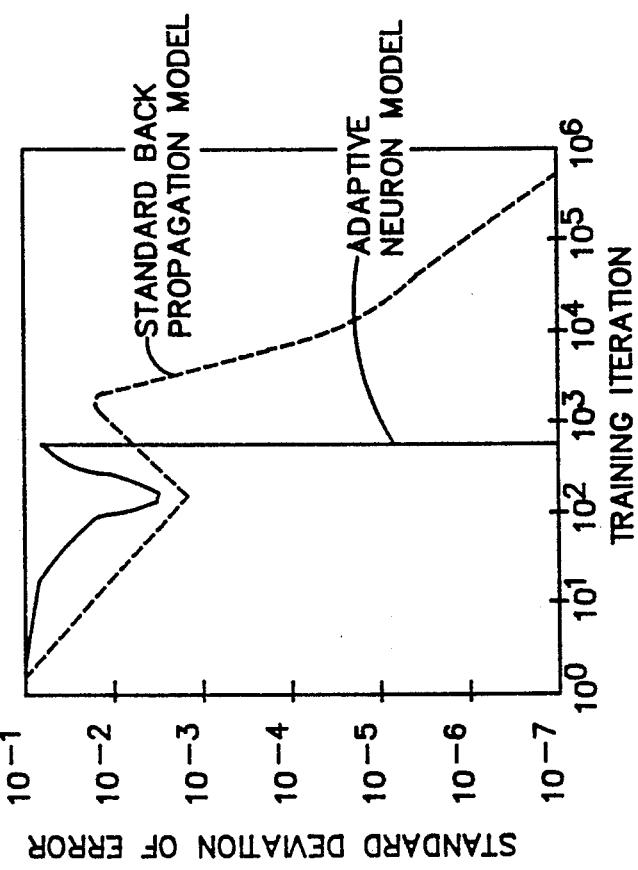
FIG. 10 is a companion graph to the graph of FIG. 9 showing the sluddard deviation versus iteration number for the adaptive neuron model and the standard back propagation model.

To fully evaluate the convergence speed of the present invention versus the prior art, a benchmark comparison between the adaptive neuron model (ANM) approach described above and plain back propagation (BP) was made. In both cases, the training was started with identical random synaptic weights lying within the range [−2.0, +2.0] and the same synaptic weight learning rate $\eta = 0.1$. The temperature of the neurons in the adaptive model were randomly selected to lie within the narrow range of [0.9, 1.1] and the temperature learning rate $\eta$ set at 0.1. FIGS. 9 and 10 summarize the training statistics of this comparison. In FIG. 9, the error is plotted against the training iteration number. In FIG. 10, the standard deviation of the error over the training set is shown plotted against the training iteration. In the first few hundred training iterations in FIG. 9, the performance of BP and ANM is similar and appears as a broad shoulder in the curve. Recall, however, that both the weights and temperatures were randomized prior to training and are, therefore, far from their final values. As a consequence of the low values of the learning rates used, the error is large and will only begin to get smaller when the weights and temperatures begin to fall in the right domain of values. In the ANM, the shoulder terminus is marked by a phase-transition like discontinuity in both error and standard deviation. For the particular example shown, this occurred at the 637th iteration. A several order of magnitude drop in the error and standard deviation is observed within the next ten iterations. This sharp drop off is followed by a much more gradual decrease in both the error and standard deviation.

Figure 11:
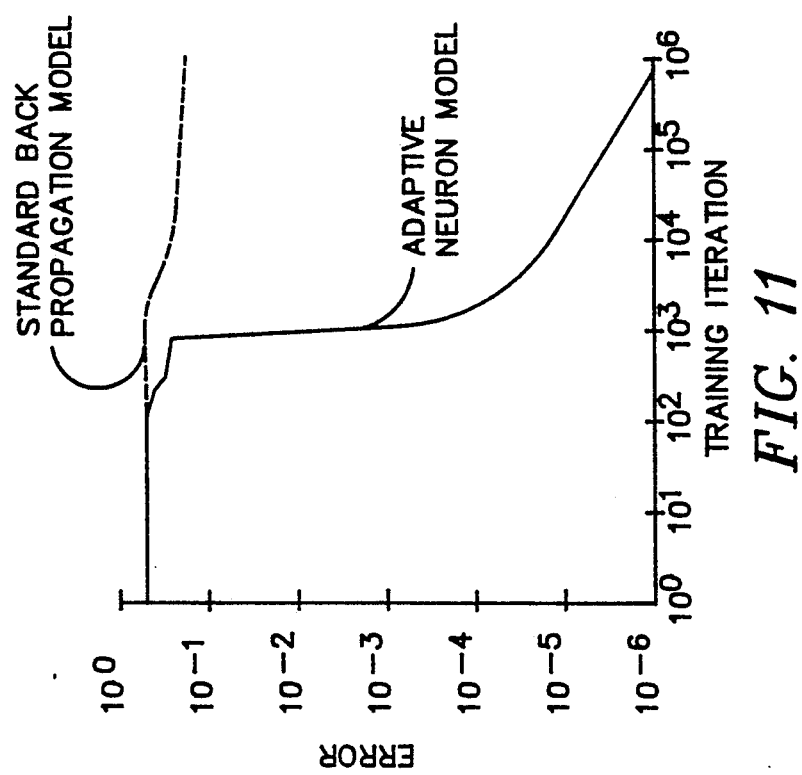
FIG. 11 is another graph showing a comparison of training statistics between the adaptive neuron model and the standard back propagation model with the error during training plotted against the training iteration number for the training case where the adaptive neuron model escapes a local minima.
Figure 12:
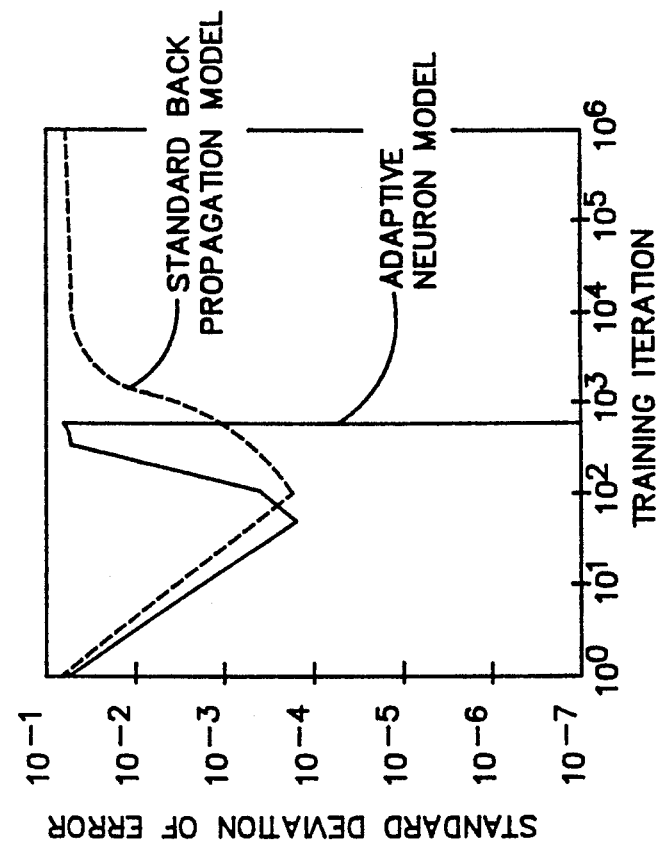
FIG. 12 is a companion graph to the graph of FIG. 11 showing the standard deviation versus iteration number for the adaptive neuron model and the standard back propagation model.

In learning the XOR problem using standard BP, it has been observed that the network frequently gets trapped in local minima. In FIGS. 11 and 12 we observe such a case as shown by the dashed line. In numerous simulations on this problem, the inventor herein has determined that the ANM approach of this invention is much less likely to become trapped in local minima as depicted by the solid line in the same figures.

Finally, it can be reported that the simulation tests run by the inventor herein provide preliminary results that indicate that the adaptive neuron approach as described above can significantly out perform prior art back propagation, for example, by reducing the learning time by several orders of magnitude. Specifically, the XOR problem was learned to a very high precision by the ANM network in about $10^3$ training iterations with a mean square error of about $10^{-6}$ versus over $10^6$ iterations with a corresponding mean square error of about $10^{-3}$ for the prior art BP approach to the same problem.

Wherefore, having thus described my invention, what is claimed is:

1. In a neural network employing a plurality of neurons each associated with a respective conductor in a network of conductors which are selectively interconnected by a plurality of problem-defining synpases each having an adjustable weighting factor whereby each neuron receives a weighted sum of inputs from plural conductors of a previous layer of said network and produces an output to a conductor in a following layer of said network, wherein the neural network is parameterized in an iterative learning process in which problem-defining signals are input to the neurons whereby to produce error signals between actual outputs from the network and expected outputs from the network and said error signals are used to incrementally change each weighting factor, an improvement for reducing the number of iterations required from the neural network to learn how to solve a problem of interest comprising:

in each neuron between an input thereof for receiving said weighted sum of inputs and an output therefor for outputting an output signal value, including a neural conductive element having a variable gain defining said output signal value as a function of (a) said variable gain and (b) said weighted sum of inputs and gain adjustment logic means for dynamically adjusting the variable gain of the neuron independently of the other neurons in the network during a learning process of the neural network.

2. The improvement to a neural network of claim 1 wherein:
said gain adjustment logic means dynamically adjusts said variable gain as a function of an instantaneous error signal.

3. The improvement to a neural network of claim 2 wherein:
said gain adjustment logic means makes incremental changes in said variable gain which are proportional to the negative of the derivative of said instantaneous error signal with respect to said variable gain.

4. The improvement to a neutral network of claim 3 wherein an incremental change $\Delta T$ for an $1^{th}$ neuron on a layer n can be given as:

$$\Delta T_l^n = -\eta \frac{\partial E}{\partial T_l^n}$$

where $\eta$ is the temperature learning rate, which is a pre-established constant and E is the sum of said instantaneous error signals.

5. A neural network comprising:
a plurality of signal paths;
a plurality of synapses each comprising means for coupling respective pairs of said signal paths together, each of said synapses having a signal weighting factor which is adjusted during an iterative learning process of said neural network; and
a plurality of neurons each comprising means for providing a respective gain in respective ones of said signal paths and for individually adjusting said respective gain independently of the other neurons in the network during an iterative learning process of said neural network.

6. The neural network of claim 5 wherein the learning process of said synapses and the learning process of said neurons are the same learning process whereby the weighting factors of each of said synapses and the gains of each of said neurons are adjusted simultaneously in said same iterative learning process of said neural network.

7. The neural network of claim 5 wherein the learning process of said synpases and the learning process of said neurons are independent learning processes, wherein changes to said gains and changes to said weights are not simultaneous.

8. The neural network of claim 5 wherein said neural network comprises first and second layers, each of said layers comprising a respective set of said signal paths and a respective set of said synapses which interconnect the signal paths in said first layer, the signal paths of said first layer having outputs connected to inputs of respective ones of said neurons and the signal paths of said second layer having inputs connected to said respective neurons.

9. The neural network of claim 8 wherein each neuron provides a summation node between (a) outputs of signal path connected together by respective synapses in said first layer and (b) an input of respective signal path in said second layer.

10. The neural network of claim 8 wherein others of said neurons have their outputs connected to inputs of respective signal paths in said first layer.

11. The neural network of claim 5 wherein said activation function is a sigmoid function having a slope which determines said gain.

12. The neural network of claim 11 wherein said function of said error signals comprise the negative derivative of said error signal with respect to said gain.

13. The neural network of claim 5 wherein said iterative training process comprises applying a set of known signals to inputs of selected ones of said signal paths and producing error signals corresponding to differences between predetermined values and signals at outputs of certain ones of said signal paths, and wherein the gain of each of said neurons is adjusted as a function of said error signals.

14. A method for training a neural network having a plurality of signal paths, a plurality of synapses each coupling a respective pair of said signal paths together, each of said synapses having a signal weighting factor and a plurality of neurons each providing a respective gain in a respective one of said signal paths, said method comprising performing an iterative learning process while:
   adjusting the weighting factors of said synapses; and
   individually adjusting the respective gains of each of said neurons independently of the other neurons in the network.

15. The method of claim 14 wherein each iterative learning process comprises a gradient descent method.

16. The method of claim 14 wherein the learning process of said synapses and the learning process of said neurons are the same learning process whereby the weighting factors of each of said synapses and the gains of each of said neurons are adjusted simultaneously in said same iterative learning process of said neural network.

17. The method of claim 14 wherein the learning process of said synapses and the learning process of said neurons are independent learning processes, wherein changes to said gains and changes to said weights are not simultaneous.

18. The method of claim 14 wherein each iterative training process comprises applying a set of known signals to inputs of selected ones of said signal paths and producing error signals corresponding to differences between predetermined values and signals at outputs of certain ones of said signal paths, and wherein said iterative learning process for said neurons comprises adjusting the gain of each of said neurons as a function of said error signals.

19. The method of claim 18 wherein said function of said error signals comprises a gradient of said error signals with respect to said gain.

* * * * *